(12) United States Patent
Kolokythas

(10) Patent No.: US 9,879,768 B2
(45) Date of Patent: Jan. 30, 2018

(54) MULTI-ELECTRIC MOTOR DRIVEN SYNCHRONOUS GEARBOX ASSEMBLY WITH MOTOR FAILURE MECHANISM

(71) Applicant: Aristeidis Kolokythas, Derveni (GR)

(72) Inventor: Aristeidis Kolokythas, Derveni (GR)

(73) Assignee: VELOS ROTORS LLC, Korinthias (GR)

( * ) Notice: Subject to any disclaimer, the term of this patent is extended or adjusted under 35 U.S.C. 154(b) by 27 days.

(21) Appl. No.: 14/568,073

(22) Filed: Dec. 11, 2014

(65) Prior Publication Data

US 2017/0089438 A1    Mar. 30, 2017

Related U.S. Application Data

(60) Provisional application No. 61/914,848, filed on Dec. 11, 2013.

(51) Int. Cl.
| | |
|---|---|
| *F16H 37/06* | (2006.01) |
| *B64C 27/14* | (2006.01) |
| *B64C 39/02* | (2006.01) |

(52) U.S. Cl.
CPC .......... *F16H 37/065* (2013.01); *B64C 27/14* (2013.01); *B64C 39/024* (2013.01); *B64C 2201/024* (2013.01); *B64C 2201/042* (2013.01); *B64C 2201/108* (2013.01)

(58) Field of Classification Search
CPC .............. B60K 6/48; B60K 2006/4808; B60K 2006/4816; B60K 2006/4833
USPC .......................................................... 74/661
See application file for complete search history.

(56) References Cited

U.S. PATENT DOCUMENTS

| | | | | |
|---|---|---|---|---|
| 2,893,525 | A * | 7/1959 | McDowall | B64D 35/00 192/113.36 |
| 3,782,223 | A * | 1/1974 | Watson | B64C 27/32 244/60 |
| 4,022,083 | A * | 5/1977 | Pollak-Banda | F16H 57/022 74/606 R |
| 4,829,850 | A | 5/1989 | Soloy | |
| 6,302,356 | B1 * | 10/2001 | Hawkins | B64C 27/12 244/17.11 |
| 6,484,967 | B2 * | 11/2002 | Protte | A63H 27/12 244/17.11 |
| 7,594,623 | B2 * | 9/2009 | Howard | B64C 27/14 244/54 |

* cited by examiner

*Primary Examiner* — Ha Dinh Ho
(74) *Attorney, Agent, or Firm* — George C. Pappas

(57) ABSTRACT

A multi-electric motor driven gearbox assembly includes a main gear coupled to at least two pinion gears. Each pinion gear is connected via an associated secondary shaft to corresponding secondary shaft pulleys that are adapted to be driven by an electric motor. A one-way bearing is coupled to each pinion gear and disposed so as to allow the pinion gear to decouple relative to the secondary shaft pulley when the associated electric motor fails and to do so without creating drag on the main gear during decoupling.

20 Claims, 15 Drawing Sheets

MULTI-ELECTRIC MOTOR DRIVEN SYNCHRONOUS GEARBOX ASSEMBLY WITH MOTOR FAILURE MECHANISM

RELATED APPLICATIONS

This application claims benefit of U.S. Provisional Patent Application No. 61/914,848, filed on 11 Dec. 2013, entitled, "GEARBOX FOR HELICOPTERS, UAVS, AND REMOTE CONTROL HELICOPTERS THAT IS UTILIZING AND COMBINING THE POWER OF MULTIPLE ELECTRIC MOTORS", commonly owned and assigned to the same assignee hereof and is hereby incorporated by reference.

TECHNICAL FIELD

The present disclosure generally relates to multi-electric motor driven gearbox assemblies, and in particular, gearbox assemblies designed to drive a main rotor shaft coupled to a propeller of a helicopter or like vehicle.

BACKGROUND

Small unmanned aircraft, and in particular unmanned aerial vehicle (UAV) type helicopters, require light-weight, low cost electric driven gearbox assemblies. A gearbox is designed to take power generated by the electric motors and convert it to rotational force imparted on the main rotor. The same gearbox may also be configured to drive the tail rotor together with the main rotor.

The use of multiple electric motors results in more power being generated from two smaller motors, as opposed to a single larger motor. The component most likely to fail in operation is one or more electric motors. Thus, whether employing one or multiple motors, the failure of any single motor during active operation can lead to serious component damage in the best of cases, and utter and complete system failure (i.e., a crash) in a worst case scenario.

The inability to identify and decouple (in real time) the failed electric motor while that motor is operational has proven to be a difficult challenge.

For many years, piloted helicopters were required to employ multiple motors (each usually large gas-driven engines weighing hundreds of pounds) as a safety measure. Complicated clutching mechanisms, which in turn also added significant additional weight to the already heavy power trains became a necessary evil.

Despite the heavy weight and cumbersome design nature of traditional piloted helicopter power trains, depending on the root of the failure, de-clutching of a failed engine section was simply not always possible.

Nevertheless the need to be able to declutch a failed section is important even in large aircraft. The idea of using multiple engines to drive a single main rotor has been adopted in single propeller driven fixed wing aircraft. In addition to being able to declutch a failed engine, the approach used in early manned (piloted) helicopter design was adopted in winged aircraft to convert twin-engine propeller-driven airplanes to single propeller multi-engine configurations. One such example is described in U.S. Pat. No. 4,829,850 to Soloy. An example perspective view of a gearbox assembly of Soloy is shown in prior art FIG. 1A. The corresponding gear train assembly is shown in prior art FIG. 1B.

The Soloy gearbox assembly shown has been adapted to date solely for use with gas-driven engines. The decoupling approach remains a problem as it requires use of a complex clutching mechanism.

With the proliferation of light-weight, special purpose application UAVs becoming popular for wide scale military and commercial applications, but also for use by hobbyists, size and weight restricted design approaches make the Soloy approach impractical.

In a UAV configuration, for example, it is common to integrate an entire power train of the UAV—including all the motors, gearbox assembly, and drive shaft torque generation—as a self-contained solution, in some cases marketed or promoted as an off-the-shelf turn-key solution, ready to install on a UAV.

The entire power train design constraints provided that any multi-motor design (including housing plates, screws, spacers and other design construction related components) weigh from a few pounds at best to no more than a few tens of pounds as a worst case scenario. Clutching mechanisms are simply not feasible. Failed motors must decouple safely and quickly. The challenge to design a new power train which uses multiple motors, each of which can safely and quickly decouple in event of motor failure remains a huge challenge in the UAV arena.

A design configuration that could inherently provide scalability in terms of providing a way that allows a designer to accommodate more than two motors, introduced another layer of complexity.

The ability of a power train design to be employable in non-helicopter type UAVs would allow for mass production leading to lower costs and more commercially available off the shelf design configurations for a variety of uses and UAV applications. Increased application usage should lead to better design and construction which translates into greater reliability overall and may also mean better quality of construction. It also means greater demand and faster consumer adoption of UAVs (drones) generally.

SUMMARY

The present disclosure is directed to a multi-electric motor driven gearbox assembly which includes a main gear coupled to at least two pinion gears. Each pinion gear is connected via an associated secondary shaft to corresponding secondary shaft pulleys that are adapted to be driven by an electric motor. A one-way bearing is coupled to each pinion gear and disposed so as to allow the pinion gear to decouple relative to the secondary shaft pulley when the associated electric motor fails and to do so without creating drag on the main gear during decoupling.

The summary is neither intended nor should it be construed as being representative of the full extent and scope of the present disclosure, which these and additional aspects will become more readily apparent from the detailed description, particularly when taken together with the appended drawings.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1A:
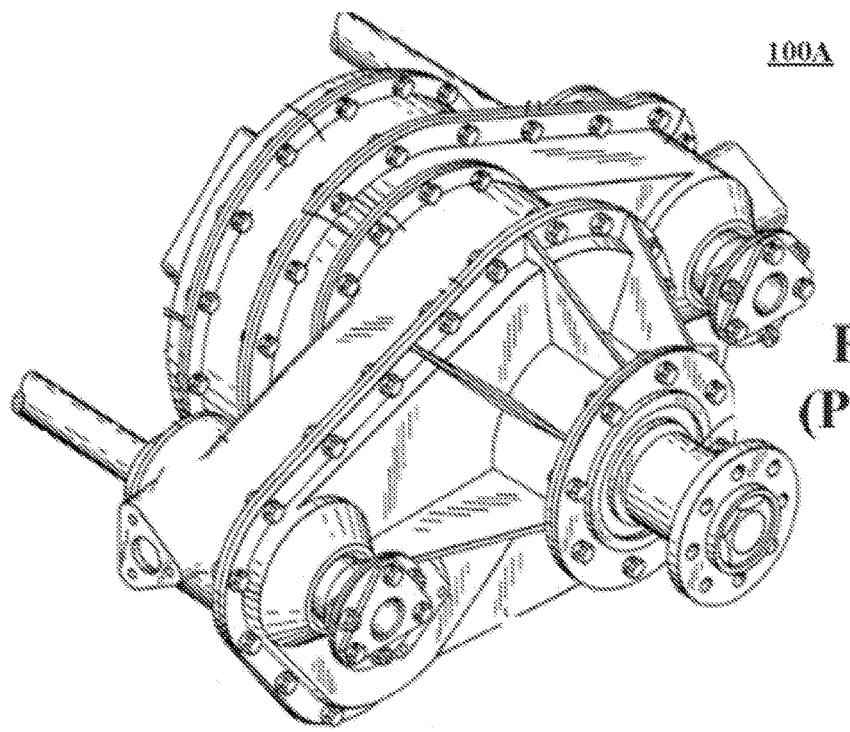
FIG. 1A are perspective views of a prior art gearbox assembly of a two engine, single-drive train propeller system for a fixed-wing aircraft.
Figure 1B:
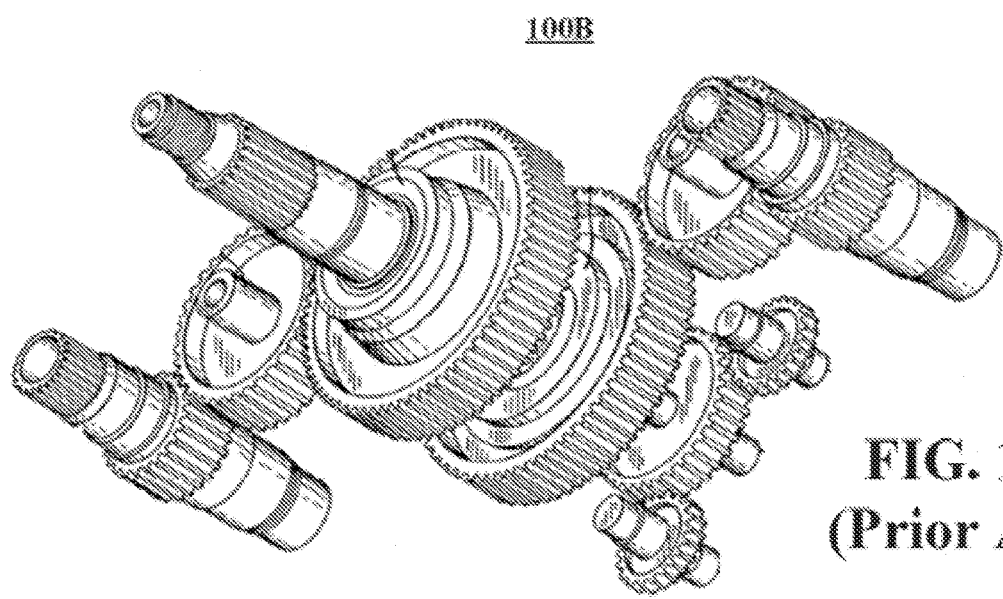
FIG. 1B shows the corresponding gear train assembly of the prior art gearbox shown in FIG. 1A.
Figure 2:
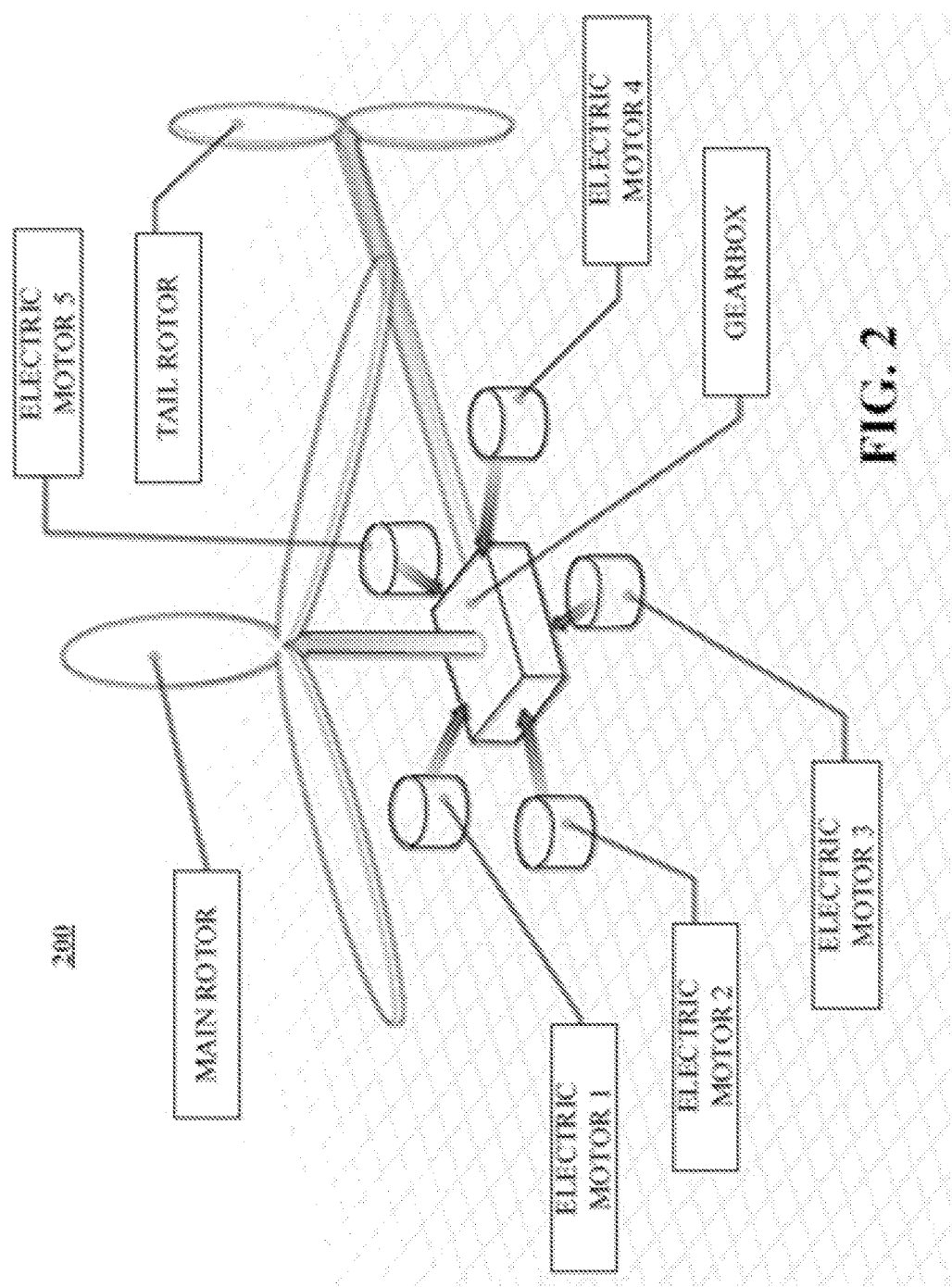
FIG. 2 is a block level diagram showing the mechanical components associated with a multi-motor power train assembly for a UAV type helicopter with all motors operational at the same time.

Referring to the drawings, FIG. 2 is a block level diagram showing the mechanical components associated with a multi-motor power train assembly for a UAV type helicopter with all motors operational at the same time.

Figure 16:
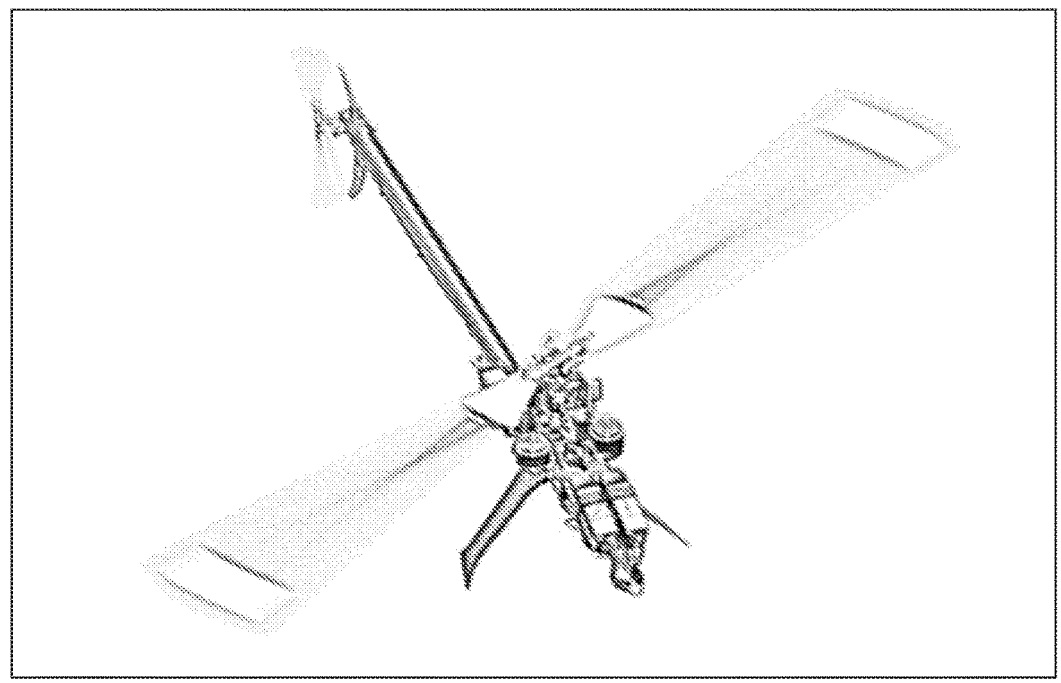

This is a theoretical representation of a power train that may be used to drive the main rotor and the tail rotor of a UAV type helicopter, such as the helicopter shown in FIG. 16.

In this theoretical representation, five electric motors (Electric Motor 1, 2, . . . 5) are shown to drive five input stages of a theoretical gearbox which in turn is adapted to transfer the sum of the power from all five operating motors to the main and tail rotors of an aircraft.

Figure 3:
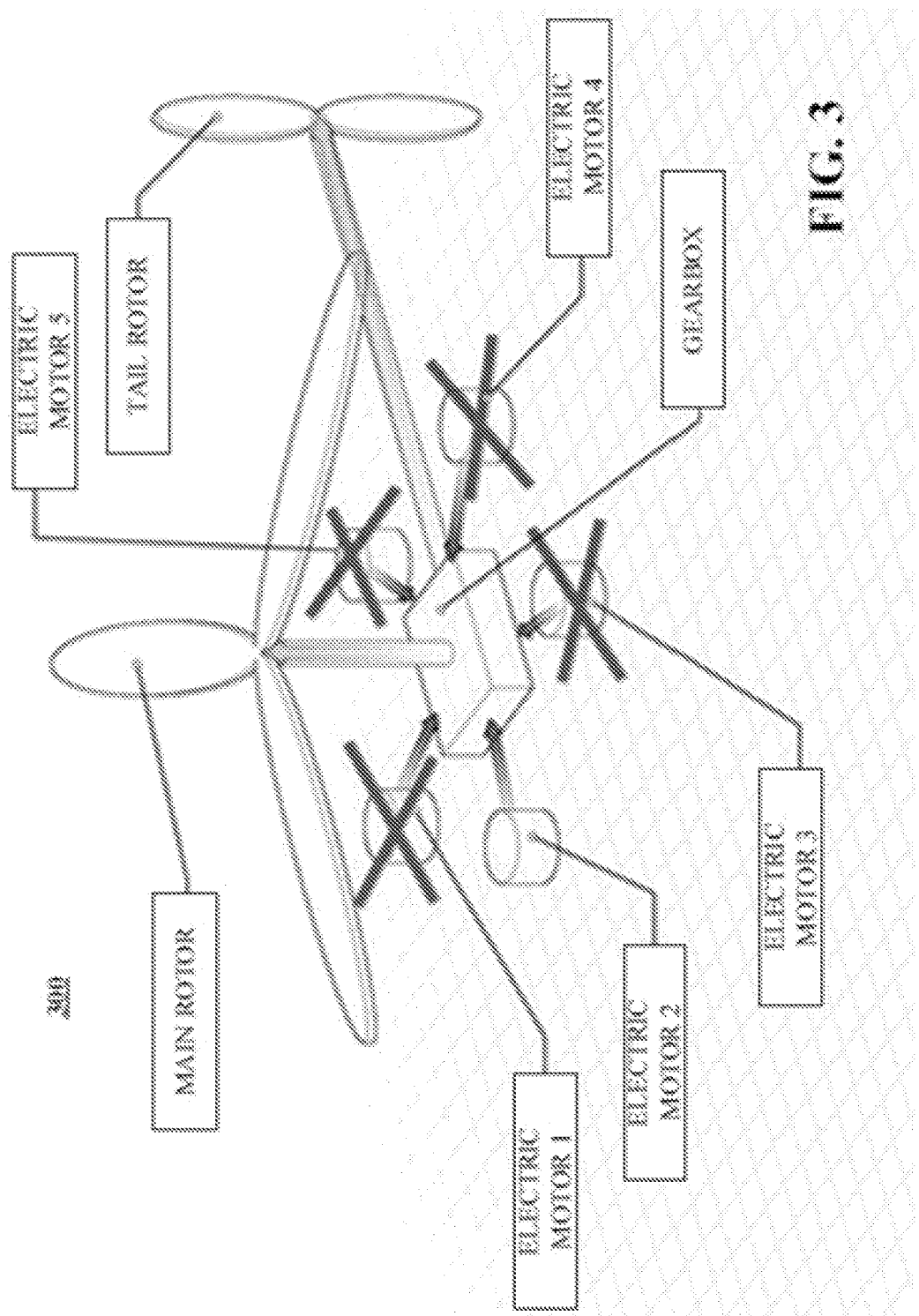
FIG. 3 is the block diagram of FIG. 2 except it is shown with four of the five electric motors experiencing some kind of failure.

FIG. 3 is the block diagram of FIG. 2 except it is shown with four of the five electric motors experiencing some kind of failure. For purposes of discussion, we will say that four out of the five electric motors are out of order. In an ideal situation, our theoretical gearbox should be able to transfer the power from the operating electric motor to the main and tail rotors at least long enough to allow the helicopter to land safely. As we have explained in the background, when multiple motors are used, a critical design goal is to be able to decouple the faulty engine or engines safely from the gearbox in some way. Unfortunately, in the case of multi-electric motor powered gearboxes, the ability to synchronously couple and decouple such motors was not until now possible. The use of traditional clutching mechanisms is impractical due to weight and size restrictions associated with UAV application deployment and design.

Figure 4:
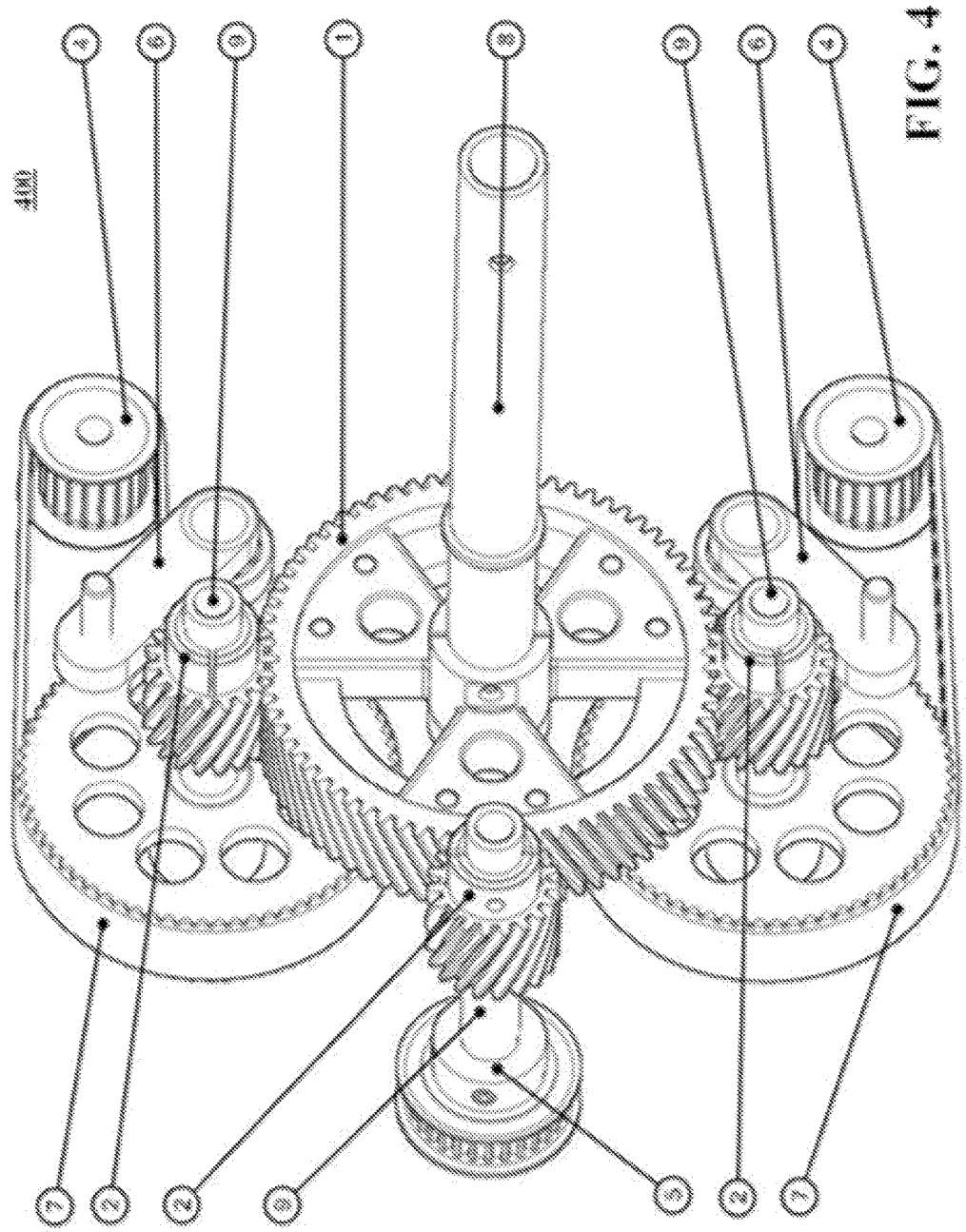
FIG. 4 is a graphical, perspective view of a two-motor, gearbox assembly in accordance with a first exemplary embodiment.

FIG. 4 is a graphical, perspective view of a two-motor, gearbox assembly 400 in accordance with a first exemplary embodiment.

Gearbox assembly consists of main gear 1, three pinion gears 2, two large pulleys 3, two electric motor pulleys 4, a single tail motor pulley 5, two belt tensioners 6, two belts 7, a main shaft 8, and three secondary shafts 9.

It should be appreciated that gearbox assembly may be implemented with more than two electric motors, using more than two electric motor pulleys, for example. This would involve simply increasing the number of secondary shaft mechanisms (described below in greater detail) to match the desired number of electric motor pulleys.

For clarity purposes, an electric motor pulley is a pulley that couples to the shaft powered by an electric motor.

Referring to FIG. 4, when an electric motor is fully operational, the corresponding pinion gear 2 transfers the associated motor-generated power to main gear 1. Main gear 1, in turn, transfers the summed power to main shaft 1, and separately also to a tail rotor shaft (not shown).

Figure 5:
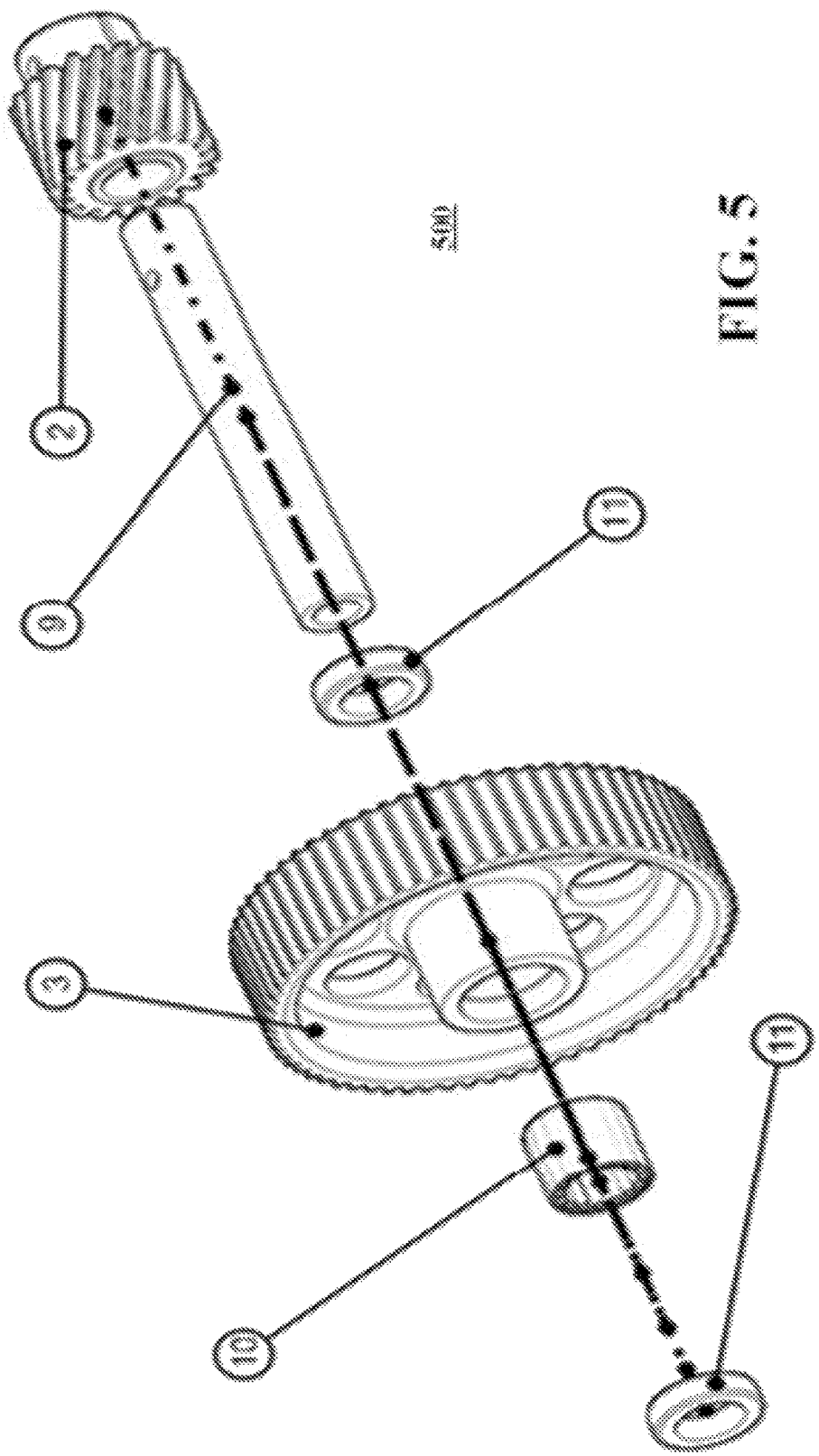
FIG. 5 is a partial exploded view of the torquing and disengaging components associated a secondary shaft mechanism, which mechanism is designed to operate as a reduction system but to also uniquely decouple from the gearbox assembly in event of motor failure.

FIG. 5 is a partial exploded view of the torquing and disengaging components 500 in a secondary shaft mechanism. A secondary shaft mechanism is a mechanism where it components are designed to operate as a reduction system when fully operational, but which simultaneously have the ability to decouple from gearbox assembly 400 in event of motor failure.

A complete secondary shaft mechanism as defined herein includes a single electric motor pulley 4, a secondary shaft 9, a pinion gear 2, a belt tensioner 6 and a belt 7, substantially as shown in FIG. 4.

FIG. 4 consists of two such secondary shaft mechanisms, two of which couple energy from the respective electric motor pulleys 4 to a pinion gear 2 which in turn transfers power to main gear 1.

When and if an electric motor fails (or quits operating) during flight for whatever reason, the corresponding secondary shaft mechanism automatically disengages the corresponding pinion gear in manner where it is no longer possible to impart drive (torque) force to gearbox assembly 400.

A secondary shaft 9 in each secondary shaft mechanism extends axially through a center hole in each of secondary pulley 3 and pinion gear 2. The distal end of secondary shaft 9 is engaged with the secondary shaft pulley with a one-way bearing, the opposite ends of which are fitted with ball bearings, as shown in FIG. 5.

The use and operation of one-way ball bearings is well known. However, by configuring the use of a one-way ball bearing as proposed herein, the rotation of secondary pulley 3 is restricted to only a single (one-way) direction. Torque applied to the shaft connected to the one-way bearing in the opposite direction, automatically causes the shaft to free-spin in place, thus disabling the pinion gear 2 which is rotationally fixed thereon from being able to receive power from the motor or from any other source on the secondary shaft mechanism. It is as if it were not there as far as the main gear is concerned.

In the event of motor failure, the remaining electric motors shall continue to transfer power to the main (and tail) rotor through the respective separate and autonomous reduction systems of the corresponding remaining secondary shaft mechanisms. In the case of FIG. 4, there is one remaining secondary shaft mechanism should the other fail.

For sake of clarity, a reduction system in connection with gear assemblies is a term of art and is used to describe different mechanical mechanisms designed to achieve a desired drive gear ratio. In the example embodiment, each secondary shaft mechanism can be designed to transfer power to the main gear through a single stage, double stage or any other multiple stage reduction system.

In each instance, the appropriate reduction system involves the careful selection and usage of gears (main and pinion), electric motor and secondary stage pulleys, as well as belts or chains or any other known combination. Also, in the case of a helicopter type use where a tail rotor may be employed, gearbox assembly may be fitted with an additional autonomous reduction/multiplying system to transfer power to the tail rotor.

A tail rotor shaft mechanism equipped with a dedicated autonomous reduction system is shown in FIG. 4. The tail rotor shaft mechanism consists of a tail rotor pulley 5 coupled by a corresponding secondary shaft 9 to a pinion gear 2. The pinion gear 2 receives power from the main gear and transfers it along the secondary shaft 9 to tail motor pulley 5, which in turn drives the tail rotor (not shown).

Figure 6:
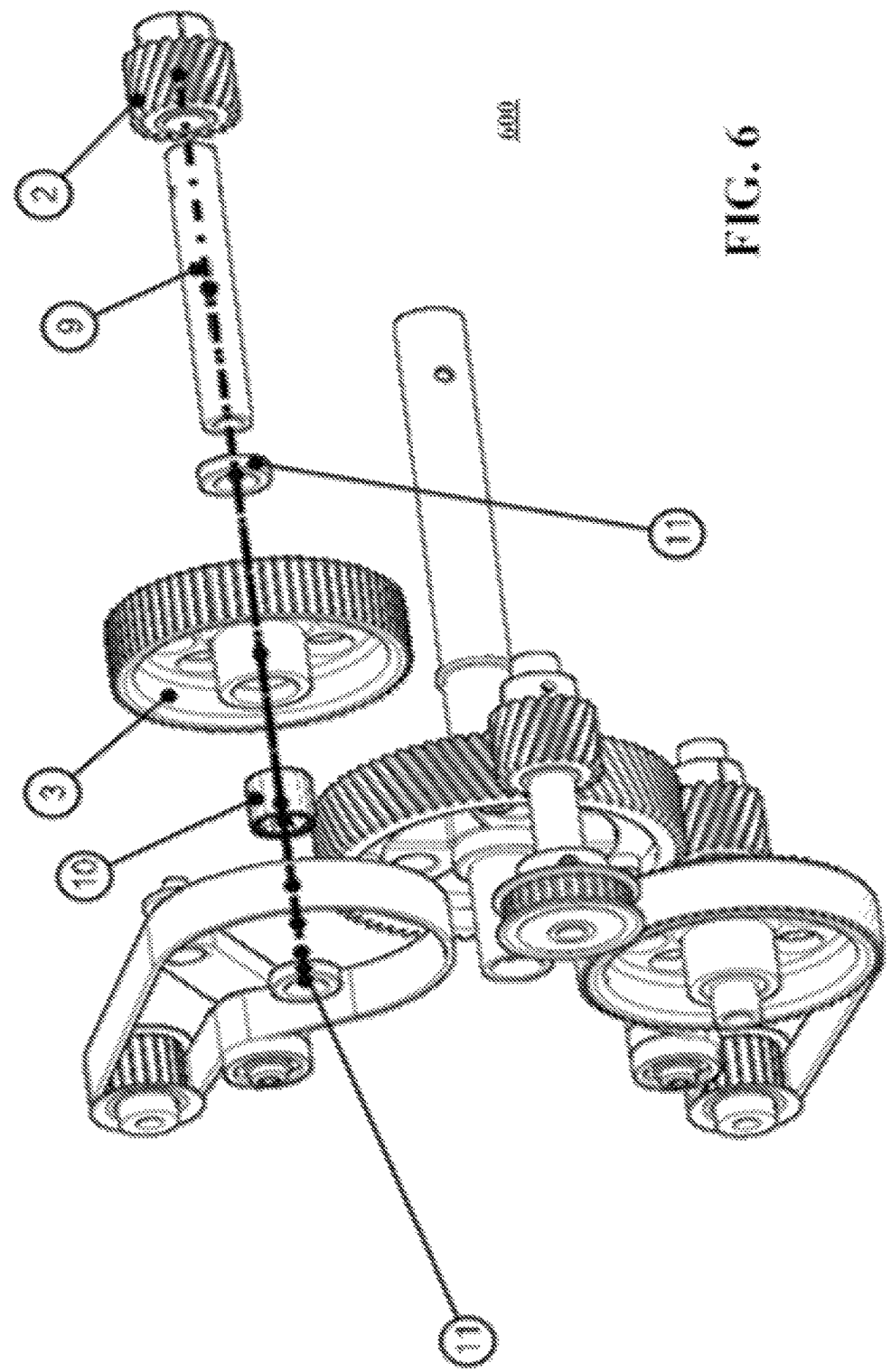
FIG. 6 is a partial perspective view of the gearbox assembly in FIG. 4, and incorporating the exploded view of the secondary shaft mechanism shown in FIG. 5.

FIG. 6 is a partial perspective view of gearbox assembly 400 in FIG. 4, incorporating therein the exploded view of the secondary shaft mechanism shown in FIG. 5.

Here, the relative positive and interconnection of components is visually better demonstrated.

Figure 7:
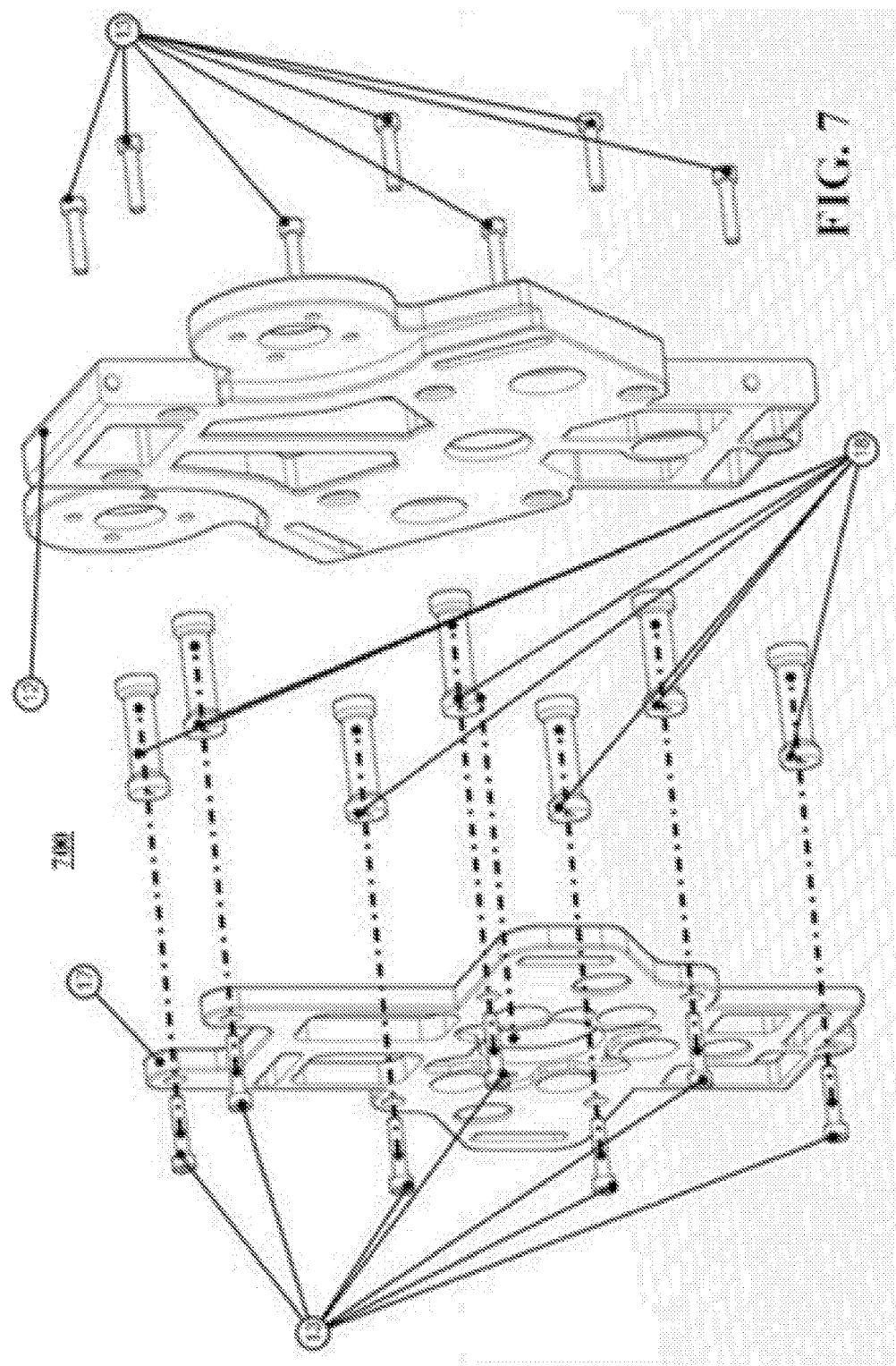
FIG. 7 is an exploded view of a base plate, a top plate, as well as associated spacers, screws and nuts that together form the housing components about the gearbox assembly shown in FIG. 4 to form an integrated package solution in accordance with an exemplary embodiment.

FIG. 7 is an exploded view of a base plate 12, a top plate 17, as well as associated spacers 18, screws 13 and nuts (not shown) in accordance with an exemplary embodiment. These components are used to nicely integrate together all the components of gearbox assembly 400 shown in FIG. 4 in a single package. The housing components shown enable a lay person or hobbyist with little or no difficulty to buy individuals components from different vendors and bring them together nicely under an available off-the shelf integrated package solution that's easy to install onto a UAV.

It should be appreciated that a number of different commercially available housing components could be made commercially available to accommodate different size electric motors, as well as different number of secondary shaft mechanism configurations.

Figure 8:
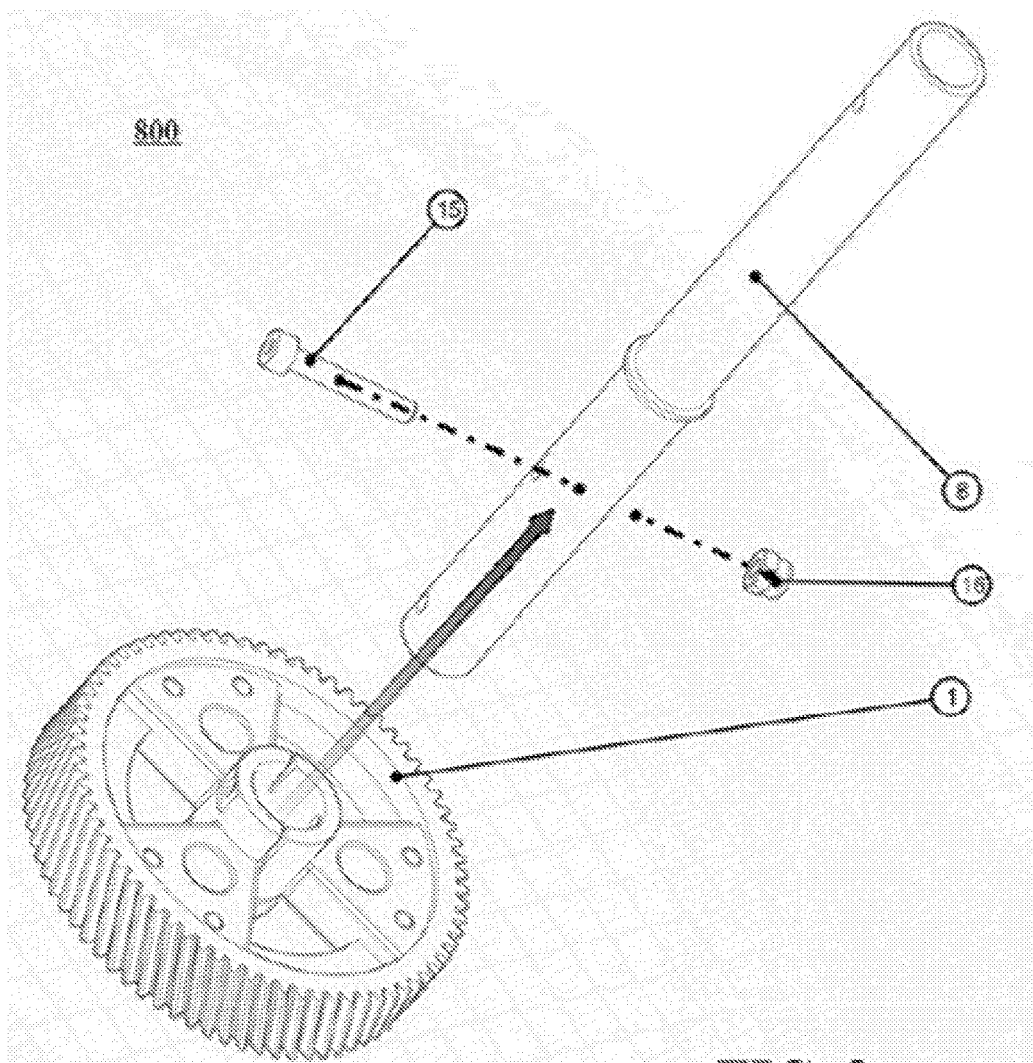
FIG. 8 is an exploded view of the torquing components associated with the main shaft mechanism.

FIG. 8 is an exploded view of the torquing components associated with the main shaft mechanism. Here the coupling of the main shaft 8 onto (into) main gear 1 is illustrated. In an exemplary embodiment, this is done using an M4 type screw and nut combination designed to fit through matching holes on the main gear that traverse the surface of main shaft 8 at or near a point of entry of main shaft 8 into a bore in the center of main gear 1

Figure 9:
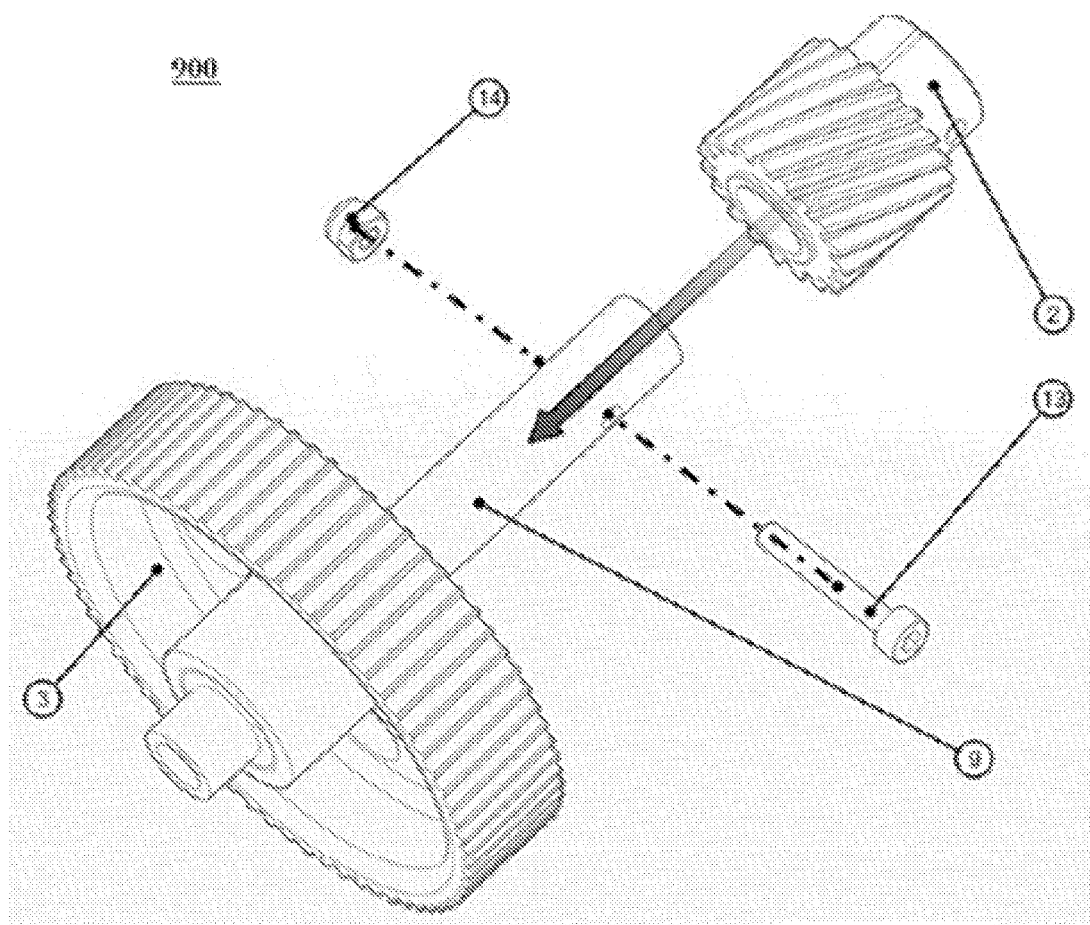
FIG. 9 is a further partial exploded view of the secondary shaft mechanism of FIG. 5.

FIG. 9 is a further partial exploded view of the secondary shaft mechanism of FIG. 5. As shown, pinion gear 2 is coupled to a secondary pulley 3 using a screw and matching nut (preferably an M3 screw/nut) which traverses cross-wise through holes disposed on a protruded bore section of pinion gear 2.

Figure 10:
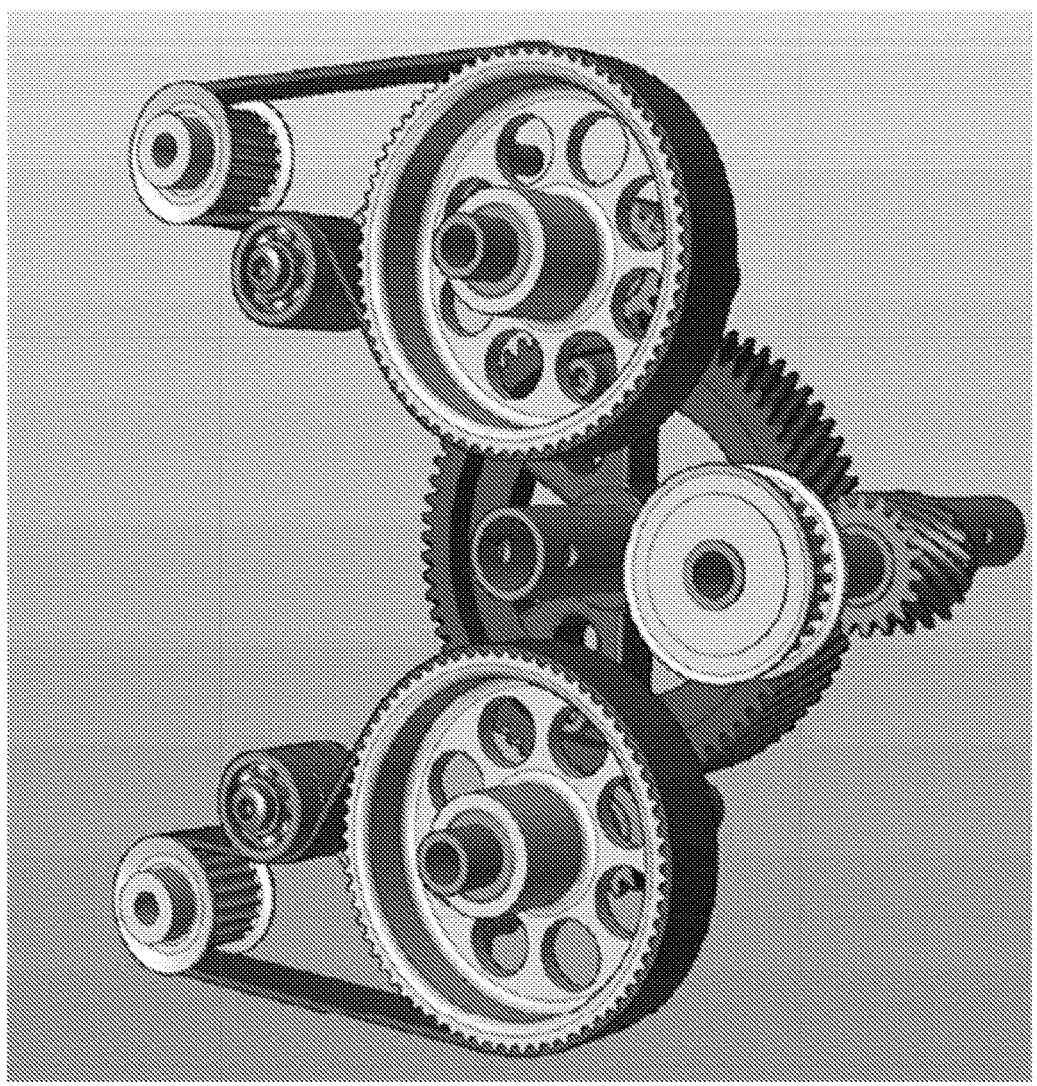
FIGS. 10 and 11 are front and reverse 3D-simulated perspective views, respectively, of the gearbox assembly shown in FIG. 4.
Figure 11:
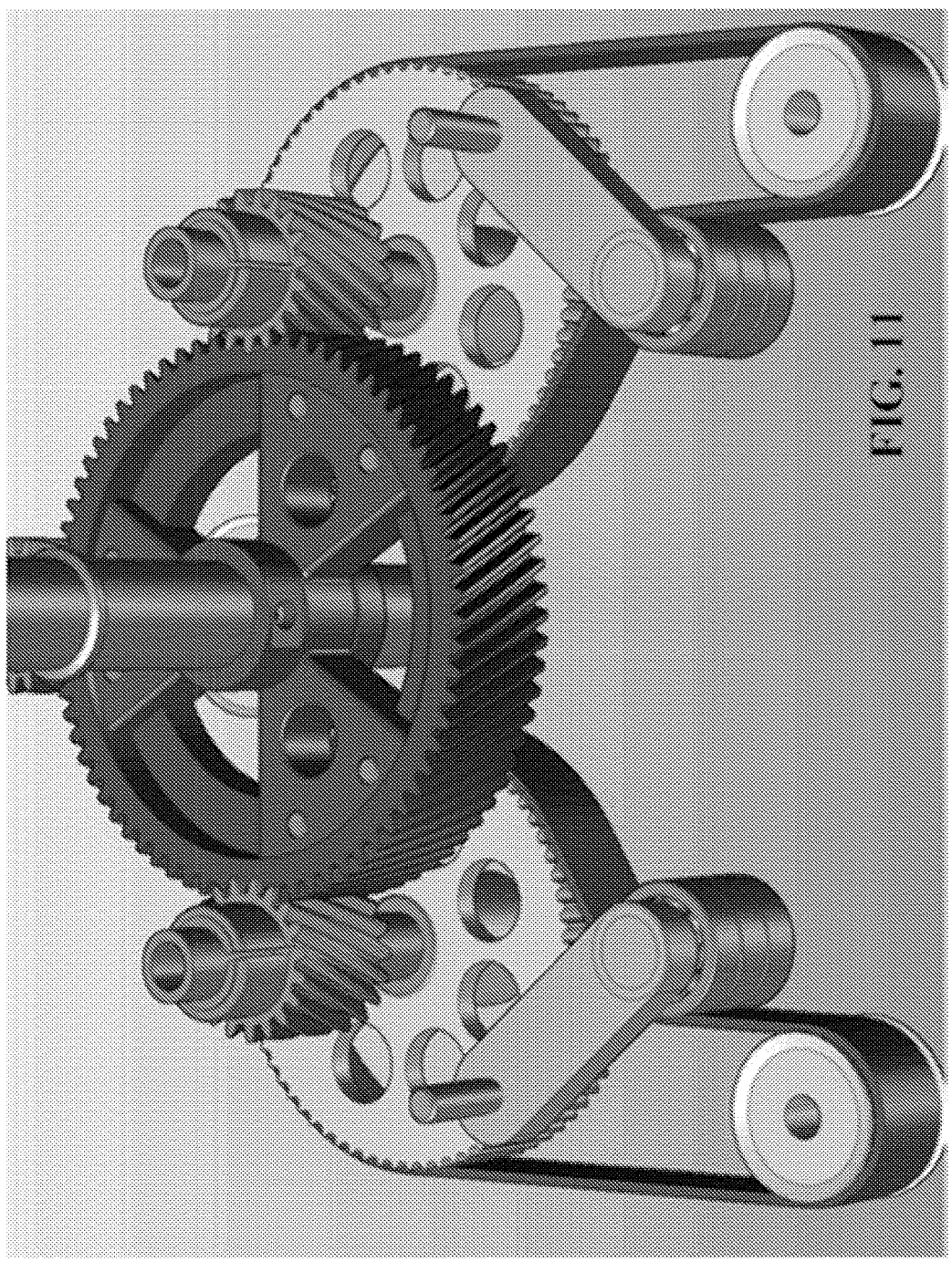

FIGS. 10 and 11 are front and reverse 3D-simulated perspective views, respectively, of the gearbox assembly shown in FIG. 4.

Figure 12:
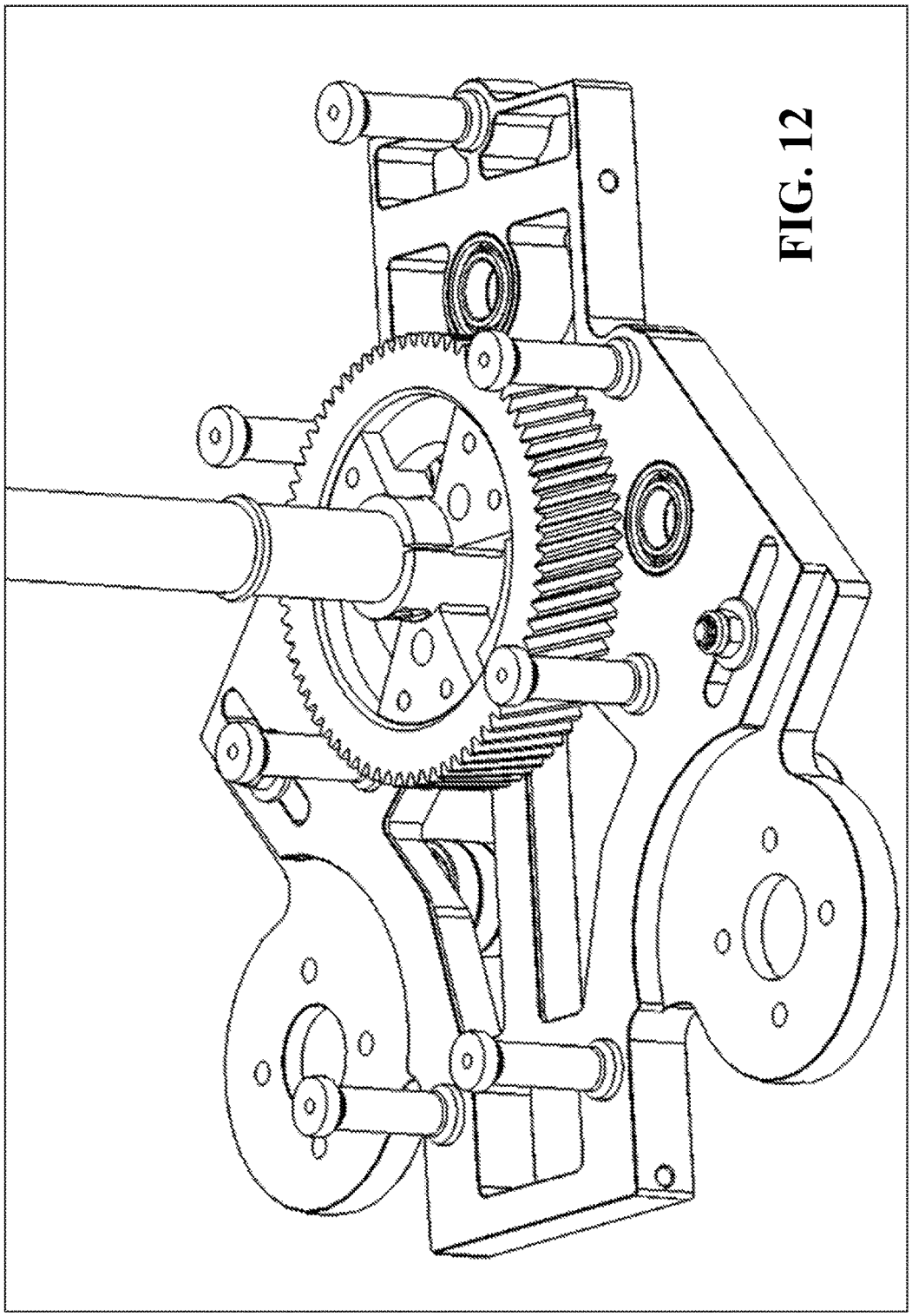
FIGS. 12-13 are photos of partial portions of a prototype of a gearbox assembly constructed in accordance with an exemplary embodiment.
Figure 13:
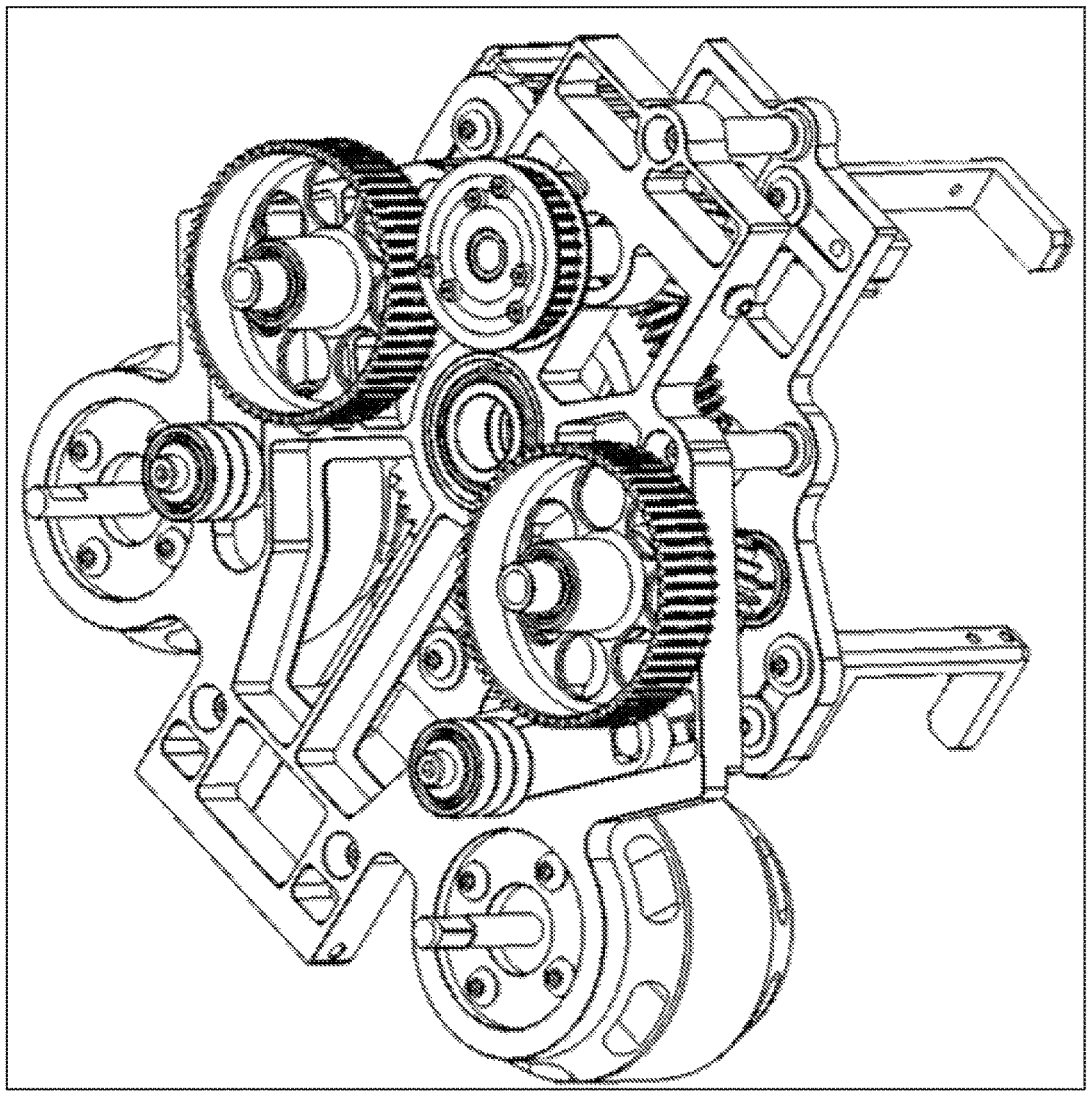

FIGS. 12-13 are photos of partial portions of a prototype of a gearbox assembly constructed in accordance with an exemplary embodiment.

Referring to FIG. 12, the bass plate 12 of FIG. 7 is shown lying flat with the main gear installed in its predefined position.

Figure 14:
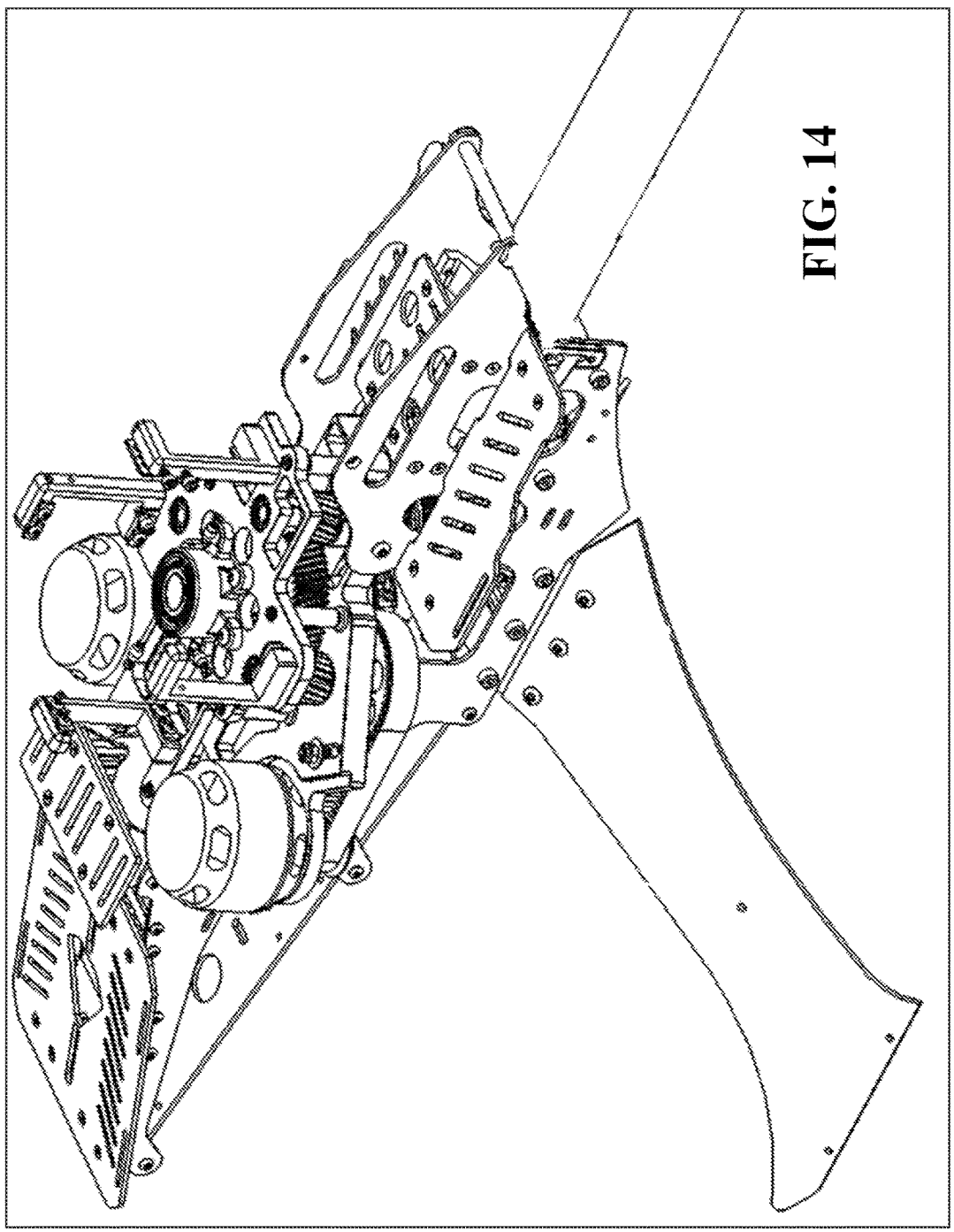
FIGS. 14-16 are photos illustrating the deployment of the prototype in an UAV-type helicopter.
Figure 15:
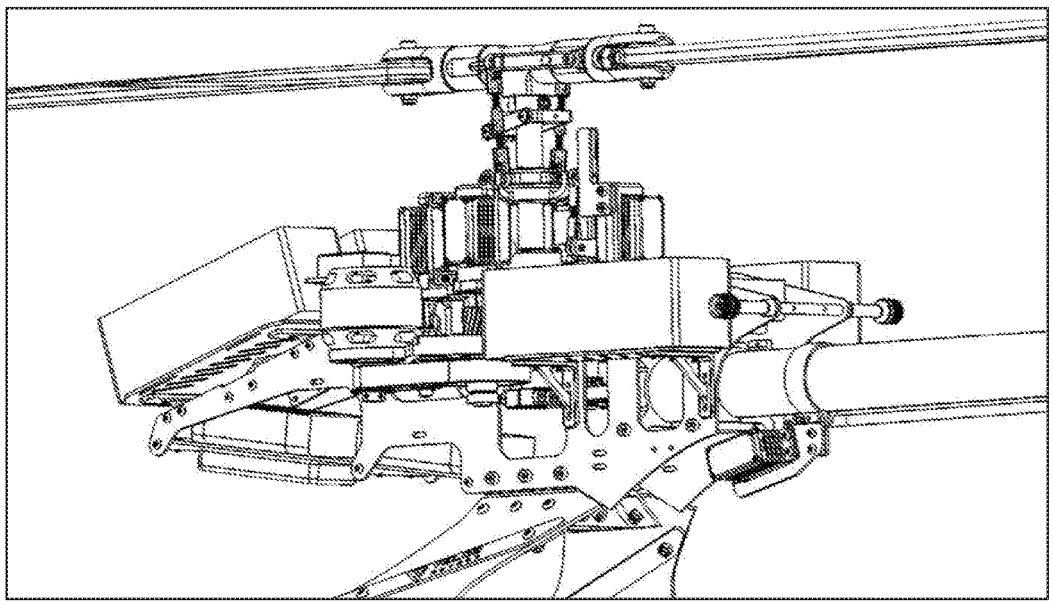

FIGS. 14-16 are photos illustrating the deployment of the prototype in an UAV-type helicopter.

As has been explained, in the present exemplary embodiment, the proposed drive train is fitted and designed for two electric motors. Each motor's output shaft is fixed on electric motor pulley 4 (shown with 19 teeth). From the pulley 4 the power is then transferred to the bigger secondary pulley 3 which, in the example shown, has 60 teeth. This energy is transferred via belt 7. Belt 7 could be a chain or some similar power transfer mechanism.

Belt 7 is a synchronous belt and has a length of 277 mm, tooth pitch 3 mm and width of 13 mm. Belt tensioner 6 is used to keep the belt firm on the pulleys.

The components as connected provide a first stage of rpm reduction with gear ratio of 1/3.15.

Secondary pulley 3 is attached to secondary shaft 9 through a one-way bearing 10, as previously described. One-way bearing 10 is permanently fixed on pulley 3. Anaerobic glue may be used for the affixing. On the top and the bottom of one-way bearing 10, two normal ball bearings 11 support the one-way bearing onto secondary shaft 9, as shown in FIG. 6.

In this regard, the role of the one way bearing is to transfer (torque) power from the motor to the rest of the gearbox while a motor is in operation. When a motor stops operating, the one-way bearing disengages all the parts between itself and the motor. This allows the rest of the gearbox to continue its operation without introducing any additional drag in the system.

In normal operation, an electric motor that is spinning will cause one-way bearing 10 to transfer all the power it gets from secondary pulley 3 to secondary shaft 9 and from there to pinion gear 2. The pinion gear in our example also has 19 teeth.

All the pinion gears are engaged to main gear 1. Main gear 1 as shown has 71 teeth.

The pinion-main gear combination form a second stage of rpm reduction with gear ratio of 1/3.73. The total rpm reduction provided by both stages running together provides a total reduction ratio of 1/11.75. Based on this total reduction ratio, an electric motor rotating at 23.500 rpm will cause the main gear 1 to rotate at 2000 rpm.

Since there are two secondary shaft mechanisms, each identical to one another, each is providing same torque, in synchronized fashion, to the main gear. The power of the two motors is summed and applied to the main gear which is then transferred to a main rotor through main shaft 8.

A third pinion gear 2 is provided. This pinion gear 2, in our example, also has 19 teeth. The 19 teeth function as a multiplying stage to provide a gear ratio of 1/3.73 which sets the rpm of the main rotor at 3.73 times the speed of the main gear, thus giving power to the tail rotor.

The use of pinion gear 2 transfers power to the tail rotor pulley 5 through a dedicated secondary shaft 9.

Tail rotor pulley 5 is connected to the tail rotor itself by a synchronous belt (not shown)

In the example configuration, the tail rotor is set so as to rotate 3.73 times faster that the main rotor. When the main rotor is rotating at 2000 rpm, tail rotor is rotating at 7460 rpm.

To make this all possible, the main and secondary shafts are mounted in place by ball bearings which in turn are mounted on two aluminium plates 12 and 17. In the example embodiment, the two plates are held apart by seven (7) spacers 18 fastened with an equal number of screws and nuts.

The dimensions, material and the exact shape of the two plates is not critical for the operation of the gearbox. One skilled in the art would appreciate that the selection of proper dimensions must take into account the type of aircraft, whether or not a tail rotor is involved, the number of motors, and other factors.

One critical design consideration is ensuring that the right distance between the main and secondary shafts is provided in order for the gears to have the correct mesh. In our example embodiment, we have set the distance between the center of main shaft 8 and the center of secondary shafts 9 at 48 mm.

Materials and Analytical Info Regarding the Construction of the Gearbox.

In the Exemplary Embodiment, Main Gear 1 is Constructed from Derlin, of helical cut and a width of 12 mm. In the center of the gear there is a 15 mm hole. Main shaft 8 is designed to pass through this hole. The hole is hollow and the surface made from hardened steel. The diameter of main shaft 8 is also 15 mm and it is fixed on main gear 1 using a vertical M4 screw. This screw passes through both main gear 1 and main shaft 8, as previously explained, and is fixed in place with a safety M4 nut.

Pinion gears 2 are each made from steel and comprised of a 19 tooth module of helical cut and tooth width of 12 mm. Pinion gears are affixed to secondary shafts 9 by vertical M3 screws and M3 lock nuts.

Secondary shaft 9 is made from hardened still and is hollow. Its diameter is 10 mm. Secondary pulley 3 has 60 tooth with pitch 3, its width is 13 mm and it is made from aluminium.

The proposed two-engine configuration is scalable. As such it allows a designer to accommodate more than two motors.

Also, the nature of the design is such that the gearbox assembly could easily be reconfigured to work on non-helicopter type UAVs. The ability of a power train design to be employable in non-helicopter type UAVs would allow for mass production leading to lower costs and more commercially available off the shelf design configurations for a variety of uses and UAV applications. Increased application usage should lead to better design and construction which translates into greater reliability overall and may also mean better quality of construction. It also means greater demand and faster consumer adoption of UAVs (drones) generally.

For hobbyists that build their own gearbox assemblies, the present design provides an easier approach.

It also possible for designers to order a complete turn-key solution as an off-the shelf product complete with motors, or without them. The whole thing could be packaged as an all-purpose power train for different uses ready to deploy.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A multi-electric motor driven gearbox assembly including a main gear coupled to at least two pinion gears, each pinion gear being connected via an associated secondary shaft to corresponding secondary shaft pulleys adapted to be driven by an electric motor, wherein a one-way bearing coupled to each pinion gear is disposed so as to allow the pinion gear to decouple relative to the secondary shaft pulley when the associated electric motor fails without creating drag on the main gear during decoupling.

2. The multi-electric motor driven gearbox assembly of claim 1, wherein said each pinion gear is configured to transfer power to the main gear based on a predefined rpm reduction ratio.

3. The multi-electric motor driven gearbox assembly of claim 2, wherein the predefined rpm reduction ratio is a two-stage rpm reduction mechanism.

4. The multi-electric motor driven gearbox assembly of claim 1, wherein said each pinion gear that is configured to transfer power to the main gear does so synchronously.

5. The multi-electric motor driven gearbox assembly of claim 4, wherein said each electric motor includes a shaft coupled to an electric motor pulley which drives power to the secondary shaft pulley via a belt or chain connected to both.

6. The multi-electric motor driven gearbox assembly of claim 1, wherein said each electric motor includes a shaft coupled to an electric motor pulley which drives power to the secondary shaft pulley via a belt or chain connected to both.

7. The multi-electric motor driven gearbox assembly of claim 6, further comprising a belt tensioner to keep the belt or chain firm against the corresponding electric motor and secondary shaft pulleys.

8. The multi-electric motor driven gearbox assembly of claim 7, wherein the belt or chain is independent from and does not rotate about the main gear nor a main shaft connected to the main gear.

9. The multi-electric motor driven gearbox assembly of claim 1, wherein the at least two pinion gears includes a pinion gear coupled to the main gear that delivers power from the main gear to a tail rotor.

10. The multi-electric motor driven gearbox assembly of claim 8, wherein said pinion gear that delivers power does so synchronously.

11. The multi-electric motor driven gearbox assembly of claim 10, wherein said pinion gear that delivers power from the main gear to the tail rotor is based on a predefined rpm reduction ratio.

12. The multi-electric motor driven gearbox assembly of claim 11, wherein the predefined rpm reduction ration is a two stage rpm reduction mechanism.

13. The multi-electric motor driven gearbox assembly of claim 1, wherein the gearbox assembly is configured for use in an unmanned aerial vehicle (UAV).

14. The multi-electric motor driven gearbox assembly of claim 13, wherein the UAV is a helicopter UAV.

15. The multi-electric motor driven gearbox assembly of claim 1, wherein the gearbox assembly is configured to receive power from two external electric motors synchronously powering the main gear.

16. A packaging assembly comprising a base plate, a top plate and spacers, the assembly being configured to facilitate mounting of a plurality of electric motors to a multi-electric motor driven gearbox assembly, the gearbox assembly being of the type including a main gear coupled to at least two pinion gears, each pinion gear being connected via an associated secondary shaft to corresponding secondary shaft pulleys adapted to be driven by a corresponding one of the plurality of electric motors, and further includes a one-way bearing coupled to each pinion gear disposed so as to allow the pinion gear to decouple relative to the secondary shaft pulley when the associated electric motor fails without creating drag on the main gear during decoupling.

17. The packaging assembly of claim 16, wherein the gearbox assembly is configured for use in an unmanned aerial vehicle (UAV).

18. The packaging assembly of claim 17, wherein the UAV is a helicopter UAV.

19. The packaging assembly of claim 16, wherein the packaging assembly includes two electric motors synchronously powering the main gear.

20. A single package power train for transferring power to a propeller shaft of a UAV helicopter comprising:

a multi-electric motor driven gearbox sub-assembly including (i) a plurality of electric motors, (ii) a main gear, (iii) at least two pinion gears coupled to the main gear where each pinion gear is further connected via an associated secondary shaft to corresponding secondary shaft pulleys adapted to be driven by a corresponding one of the plurality of electric motors, and (iv) a one-way bearing coupled to each pinion gear disposed so as to allow the pinion gear to decouple relative to the secondary shaft pulley when the associated electric motor fails without creating drag on the main gear during decoupling; and a packaging assembly including a base plate, a top plate and spacers to package the multi-electric motor driven gearbox sub-assembly as a single package power train.

* * * * *